Figure 1:
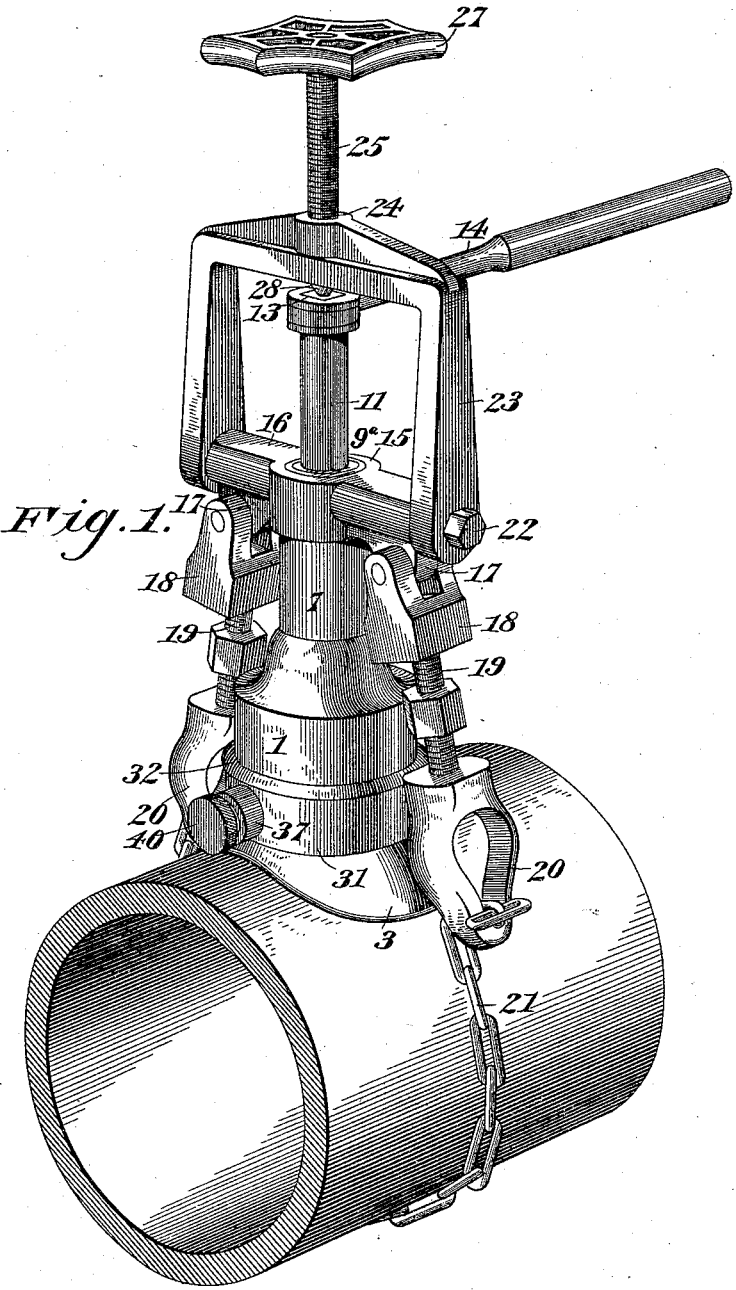

(No Model.) 2 Sheets—Sheet 1.

W. S. PAYNE.
TAPPING MACHINE.

No. 578,418. Patented Mar. 9, 1897.

Witnesses:
J. M. Witherow
D. T. Hollanb…

Inventor,
Walter S. Payne,

By his Attorneys.
C A Snow & Co.

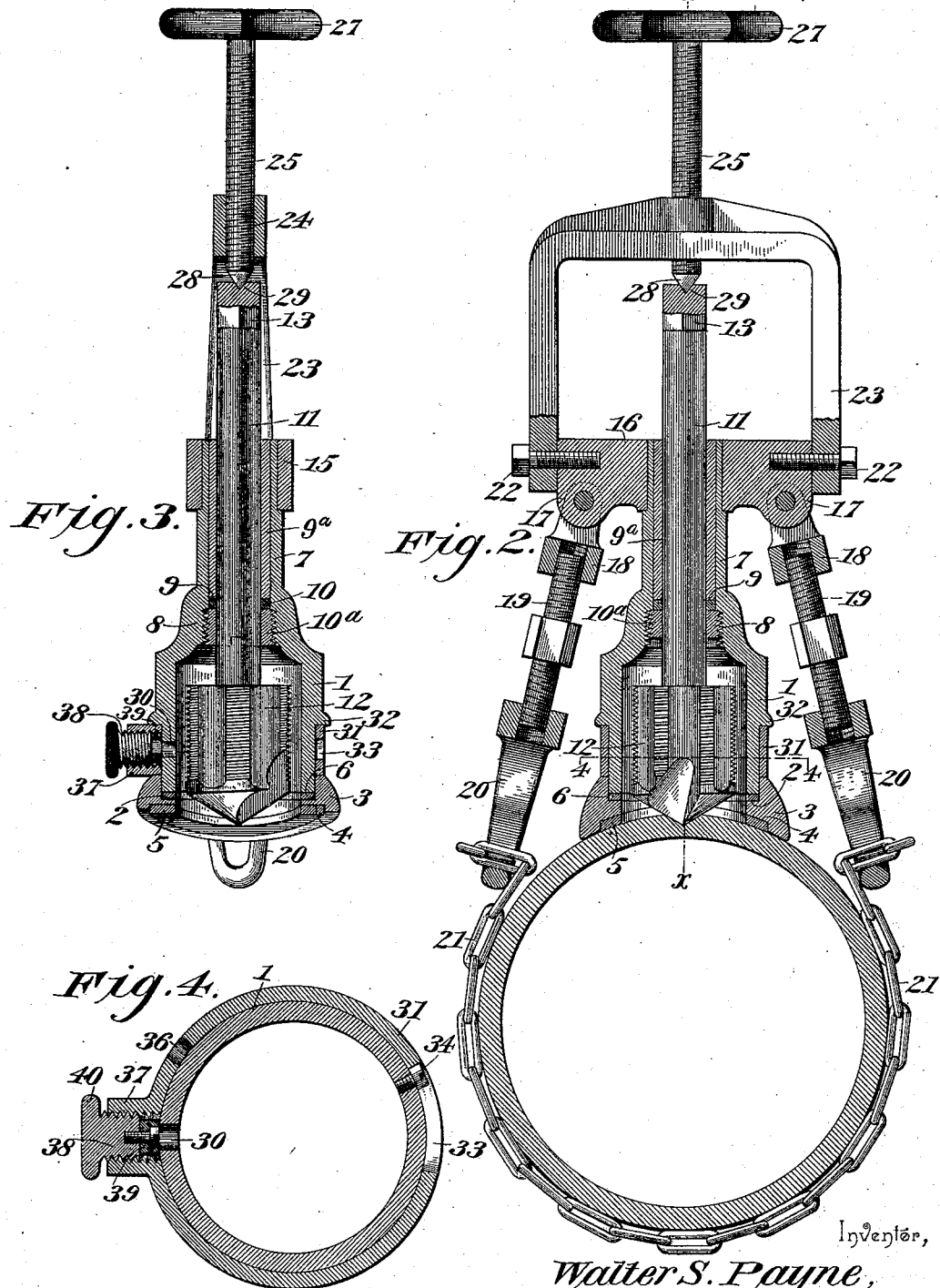

UNITED STATES PATENT OFFICE.

WALTER S. PAYNE, OF FOSTORIA, OHIO.

TAPPING-MACHINE.

SPECIFICATION forming part of Letters Patent No. 578,418, dated March 9, 1897.

Application filed February 12, 1895. Serial No. 538,165. (No model.)

*To all whom it may concern:*

Be it known that I, WALTER S. PAYNE, a citizen of the United States, residing at Fostoria, in the county of Seneca and State of Ohio, have invented a new and useful Tapping-Machine, of which the following is a specification.

This invention relates to tapping-machines; and it has for its object to provide a new and useful machine of this character especially adapted for tapping gas or other dry pipes where the pressure is light.

To this end the main and primary object of the present invention is to construct a tapping-machine with special reference to simplicity and easy manipulation, so that the same can be readily and quickly adjusted to a pipe for the purpose of tapping the same.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a tapping-machine constructed in accordance with this invention shown as applied in position on a main for tapping the same. Fig. 2 is a central vertical sectional view thereof. Fig. 3 is a vertical section on the line $x\,x$ of Fig. 2. Fig. 4 is a transverse or horizontal sectional view on the line 4 4 of Fig. 2.

Referring to the accompanying drawings, 1 designates a cylindrical hollow casing-body that is designed to accommodate the movement of the tapping-tool employed, while at the same time preventing any escape of liquid or fluid from the main being tapped. The hollow cylindrical casing-body 1, when the machine is set up for operation, is designed to rest at its lower end in the flanged seat 2, formed in the upper side of the pipe-saddle 3. The pipe-saddle 3 may be of any desired curve, according to the size of the main being tapped, and is also provided in its lower side with a gasket recess or seat 4 to accommodate a gasket 5, which, by being pressed tight on the main or pipe being tapped, provides a perfectly water and gas tight joint between the saddle and the main or pipe upon which it is fitted. The seat 2, formed in the upper side of said saddle, also accommodates therein a rubber or other suitable gasket 6, which forms a water or gas tight connection between the lower end of the casing-body 1 and the said saddle 3.

In the present invention the hollow cylindrical casing-body 1 is provided at the top with an upwardly-extending straight-bored bearing-neck 7, at the lower end of which neck is formed an enlarged interiorly-threaded portion 8 adjacent to the interior shoulder 9, against which is placed a packing-ring or washer 10, that is removably and tightly secured in position within the said neck 7 by means of an exteriorly-threaded bushing or ring $10^a$, removably engaging in the enlarged interiorly-threaded portion 8 at the lower end of the said bearing-neck 7. The interior shoulder 9 is formed adjacent to the enlarged threaded portion 8 by the lower end of the interior lining-sleeve $9^a$ snugly fitting within the bearing-neck 7 and closely surrounding the tool-stem 11 to provide a snug fit for said stem within the bearing-neck, while at the same time taking up the wear thereof, and in this connection it may be noted that when the interior lining-sleeve $9^a$ has become worn the same may be readily removed and replaced.

The bearing-neck 7, as stated, accommodates for rotation and reciprocation therein the tool-stem 11, which is snugly embraced by the packing-ring or washer 10, which provides a fluid and gas tight joint between the stem 11 and the bearing-neck in which it works to prevent the escape of fluid or gas from the main being tapped up through the bearing-neck 7 of the casing-body. The said stem 11 carries at its lower end the screw-tap 12, that works inside of the cylindrical hollow casing-body of the machine and is designed to tap the hole in the main on which the machine is mounted, and the said stem 11, which carries at its lower end the tap or bit, is provided at its upper end, above the upper end of the bearing-neck 7, with a squared extremity 13, to which is adapted to be connected an operating wrench or lever 14 of any suitable construction to provide for imparting the necessary rotation to the tapping tool or bit.

The upper end of the bearing-neck 7 of the casing-body 1 is tightly fitted in the collar 15, formed centrally on the transversely-arranged fastening-bar 16. The fastening-bar 16 is provided at both sides of its central collar 15 with the depending perforated attaching-lugs 17, to which are pivotally connected the clevises 18. The clevises 18 are of an ordinary construction and have adjustably connected thereto one end of the right and left threaded adjusting-screws 19, the other ends of which adjustably engage with the chain-harps 20, which receive the opposite ends of the fastening-chain 21, that encircles the main being tapped. After encircling the main to be tapped with the chain 21 and securing the ends of said chain in the chain-harps 20 the adjusting-screws 19 are adjusted to provide for tightening up the chain and consequently tightly clamping the cylindrical hollow casing-body of the machine directly onto the main, so that the tapping thereof may be proceeded with.

The transverse fastening-bar 16 receives in its opposite ends the pivot studs or screws 22, on which are pivotally mounted the lower opposite extremities of an inverted-U-shaped feed-yoke 23. The inverted-U-shaped feed-yoke 23 is provided centrally in the transverse top portion thereof with a threaded feed-opening 24, that accommodates therein the feed-screw 25. The feed-screw 25 is provided at its upper end with a hand-wheel 27 and with a pointed lower end 28, adapted to work in the socket or recess 29, formed in the top end of the tool-stem 11, and by adjusting the feed-screw the same provides means for forcing the tap or bit 12 downward to feed the same into the hole as the drilling and tapping progresses.

Near the lower end of the cylindrical hollow casing-body the same is provided in one side with an oiling hole or opening 30, over which is arranged to work a circularly-movable cut-off ring or band 31. The circularly-movable cut-off ring or band 31 is mounted to turn on the casing-body 1 directly above its lower end and works under an exterior annular bearing-flange 32, formed on the exterior of the said casing-body. The cut-off ring or band 31 is provided at a suitable point in its lower edge with a limiting slot or notch 33, that receives a stop-pin 34, projected from the casing-body 1, and the said ring or band 31 is also provided with an oiling hole or opening 36, that is adapted to register with the oiling hole or opening 30 in the casing-body 1 to open up communication with the interior of the casing-body for the nozzle of an oil-can when oiling is necessary. Adjacent to the oiling hole or opening 36 in the ring or band 31 the latter is provided with an offstanding interiorly-threaded collar 37, that receives an exteriorly-threaded screw valve-plug 38, provided at its inner end with a packing-disk 39 and its outer end with a finger-knob 40. The finger-knob 40 provides means for moving the ring or band 31 to carry the oiling hole or opening 36 in and out of alinement with the corresponding hole in the casing-body, and when the ring or band 31 is turned to the position which carries the hole or opening 36 away from the hole or opening 30 by tightening the screw-plug 38 the packing-disk 39 will be clamped tightly over the hole or opening 30 in the casing-body to provide for closing such opening to prevent the escape of liquid or gas therefrom.

From the above it is thought that the construction, operation, and many advantages of the herein-described machine will be readily apparent to those skilled in the art without further description, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a tapping-machine, the combination of the hollow casing-body provided in one side with an oiling hole or opening, the tapping mechanism, a circularly-adjustable cut-off ring or band mounted to turn on the casing and provided with a hole or opening adapted to be carried in and out of alinement with the hole or opening in the casing, and an adjustable valve fitted in the ring or band and adapted to be adjusted over said latter hole or opening when not in use substantially as set forth.

2. In a tapping-machine, the combination of the hollow casing-body provided in one side with an oiling hole or opening and with an exterior annular flange above said hole or opening, a circularly-movable cut-off ring or band mounted for a limited movement on the casing and provided with an oiling hole or opening and with an offstanding interiorly-threaded collar adjacent to said hole or opening, and an exteriorly-threaded screw-plug mounted within said collar and adapted to work over the hole or opening in the casing-body when the hole or opening in the ring or band is thrown out of alinement therewith, substantially as set forth.

In testimony that I claim the foregoing as my own I have hereto affixed my signature in the presence of two witnesses.

WALTER S. PAYNE.

Witnesses:
M. RIPLEY,
P. M. HENDERSHOTT.